United States Patent
Riviere et al.

(10) Patent No.: US 12,434,983 B2
(45) Date of Patent: Oct. 7, 2025

(54) METHOD FOR TREATING WATER TO REDUCE THE DISSOLVED SILICA CONTENT THEREOF

(71) Applicant: Veolia Water Solutions & Technologies Support, Saint-Maurice (FR)

(72) Inventors: Bastien Riviere, Brueil en Vexin (FR); Vincent Georgeaud, Jouy le Moutier (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 853 days.

(21) Appl. No.: 17/620,897

(22) PCT Filed: Jul. 13, 2020

(86) PCT No.: PCT/EP2020/069778
§ 371 (c)(1),
(2) Date: Dec. 20, 2021

(87) PCT Pub. No.: WO2021/009130
PCT Pub. Date: Jan. 21, 2021

(65) Prior Publication Data
US 2022/0348480 A1    Nov. 3, 2022

(30) Foreign Application Priority Data
Jul. 12, 2019   (FR) .................................. 1907868

(51) Int. Cl.
*C02F 1/28*   (2023.01)
*B01J 20/06*  (2006.01)
(Continued)

(52) U.S. Cl.
CPC ............... *C02F 1/281* (2013.01); *B01J 20/06* (2013.01); *B01J 20/28004* (2013.01);
(Continued)

(58) Field of Classification Search
CPC ...... C02F 1/281; C02F 1/008; C02F 2101/10; C02F 2209/40; C02F 2303/16;
(Continued)

(56) References Cited

U.S. PATENT DOCUMENTS 7,153,434 B1   12/2006  Dennis
7,291,578 B2   11/2007  SenGupta et al.
(Continued)

FOREIGN PATENT DOCUMENTS

AR     047497 A1     1/2006
EP     2111380 A1   10/2009
(Continued)

OTHER PUBLICATIONS

Genz, A., et al., "NOM removal by adsorption onto granular ferric hydroxide: Equilibrium, kinetics, filter and regeneration studies", Water Research 42, Elsevier Ltd., Dec. 10, 2006, pp. 238-248.
(Continued)

*Primary Examiner* — Ekandra S. Miller-Cruz
(74) *Attorney, Agent, or Firm* — COATS & BENNETT, PLLC

(57) ABSTRACT

Method for treating water to reduce the dissolved silica content thereof, the method being characterised in that it comprises at least one step of adsorbing the dissolved silica, the step consisting in passing the water through a reactor housing an adsorbent granular material consisting of grains of iron hydroxide (III) and/or iron oxyhydroxide (III) and at least one step of regenerating the adsorbing power of the granular material, the step consisting in bringing the granular material into contact with a base and at least one chloride.

8 Claims, 1 Drawing Sheet

(51) Int. Cl.
  *B01J 20/28*  (2006.01)
  *B01J 20/34*  (2006.01)
  *C02F 1/00*  (2023.01)
  *C02F 101/10*  (2006.01)

(52) U.S. Cl.
  CPC ..... *B01J 20/28016* (2013.01); *B01J 20/3433* (2013.01); *B01J 20/3475* (2013.01); *C02F 1/008* (2013.01); *C02F 2101/10* (2013.01); *C02F 2209/40* (2013.01); *C02F 2303/16* (2013.01)

(58) Field of Classification Search
  CPC . C02F 2103/02; C02F 2305/023; B01J 20/06; B01J 20/28004; B01J 20/28016; B01J 20/3433; B01J 20/3475
  USPC .......................................................... 210/673
  See application file for complete search history.

(56) References Cited

U.S. PATENT DOCUMENTS

| | | | |
|---|---|---|---|
| 8,597,519 B2 * | 12/2013 | Hata | B01J 20/041 210/683 |
| 10,843,166 B2 | 11/2020 | Hirokawa et al. | |
| 2002/0077249 A1 | 6/2002 | Schlegel et al. | |
| 2005/0156136 A1 | 7/2005 | SenGupta et al. | |
| 2008/0173583 A1 | 7/2008 | Boodoo et al. | |
| 2010/0247415 A1 | 9/2010 | Gottlieb et al. | |

FOREIGN PATENT DOCUMENTS

| | | |
|---|---|---|
| JP | 200831018 A | 2/2008 |
| JP | 2018126723 A | 8/2018 |
| WO | 2008069561 A1 | 6/2008 |
| WO | 2017110736 A1 | 6/2017 |

OTHER PUBLICATIONS

Chen, A., et al., "Regeneration of iron-based adorptive media used for removing arsenic from groundwater", Water Research 77, Elsevier Ltd., Dec. 9, 2014, pp. 85-97.

Banerjee, K., et al., "Kinetic and thermodynamic aspects of adsorption of arsenic onto granular ferric hydroxide (GFH)", Water Research 42, Elsevier Ltd., Feb. 19, 2008, pp. 3371-3378.

The Dow Chemical Company, "DOWEX Ion Exchange Resins, Using Ion Exchange Resin Selectivity Coefficients", Technical Information—Form No. 177-01755-0207, Dec. 10, 2021, pp. 1-3.

Swedlund, P., et al., "Adsorption and Polymerisation of Silicic Acid on Ferrihydrite, and its Effect on Arsenic Adsorption", Water Research, Elsevier Science Ltd., Jul. 1, 1998, pp. 3413-3422, vol. 33, No. 16.

Xie, B., et al., "Modeling of arsenic(V) adsorption onto granular ferric hydroxide", Journal (American Water Works Association), Nov. 1, 2007, pp. 92-102, vol. 99, No. 11.

Möller, T., et al., "Effect of silica and pH on arsenic uptake by resin/iron oxide hybrid media", Water Research, Elsevier Ltd, Nov. 17, 2007, pp. 1760-1766, No. 42.

Wuming, W., "Experimental study on the preparation of silica, iron and magnesium-bearing products using the self-reactivity between tailings and waste acid water", Geomaterial and Environmental Mineralogy, Jun. 15, 2007, pp. 1-153, Peking University, China.

CN Search Report mailed Feb. 9, 2023 in re CN Application No. 202080050514.1 filed Jul. 13, 2020.

Naren, G., et al., "Adsorption kinetcis of silicic acid on akaganeite", Journal of Colloid and Interface Science, Jun. 1, 2013, vol. 399, pp. 1-3.

Yang, L., et al., "Types, Structure and Mineral Composition of Polymetallic Nodules", China University of Geosciences Press, Jan. 31, 1997, pp. 1-2.

* cited by examiner

METHOD FOR TREATING WATER TO REDUCE THE DISSOLVED SILICA CONTENT THEREOF

TECHNICAL FIELD OF THE INVENTION

The invention relates to a method for treating water to reduce the dissolved silica content thereof.

More specifically, the invention relates to such a method wherein the dissolved silica is adsorbed on a regenerable adsorbent material.

PRIOR ART

Silicon (Si) is present in many rocks and sediments. Through various chemical alteration processes, this element is found in many types of water (sea water, brackish water, water from rivers and lakes, etc.). Although the chemistry of silicon in water is complex and poorly understood, it is known that silicic acid is found in soluble form ("dissolved silica") in these waters in concentrations that vary depending in particular on the chemical species they contain and their temperature. However, this dissolved silica has a number of disadvantages when it is desired to use such water for certain applications.

Indeed, this dissolved silica can precipitate under certain conditions and thus cause malfunctions of certain equipment using this water.

For example, its presence is undesirable in water intended to supply boilers, in water intended to be treated in evapo-concentrators, in water intended to be treated by membrane filtration devices, in particular those incorporating reverse osmosis membranes, etc. In such installations, dissolved silica can precipitate and scale or clog the equipment.

This dissolved silica can also constitute a troublesome species as such, not because it can precipitate but because it will disturb by its presence certain chemical or physico-chemical reactions involved in the treatment of certain water. For example, the presence of silica generates colloidal impurities in certain liquid-liquid extraction methods that greatly disrupt phase separation. Another example is the interfering nature of dissolved silica in chelating resin methods aiming at removing other compounds.

There are various techniques in the prior art for reducing the content of dissolved silica in water.

Thus, they can be coagulated or electro-coagulated then clarified. However, these methods lead to the production of sludge which must also be treated, and involve the use of large amounts of coagulating agent, which increases their costs.

It is also known to co-precipitate dissolved silica in the presence of alkali metals. Besides the fact that this technique also requires large amounts of chemical reagents such as caustic soda or lime to cause the formation of insoluble alkali metal salts, it also implies the need, when the concentration of alkali metal dissolved in the water to be treated is low, of having to add to said water large amounts of highly soluble alkali metal salts, such as magnesium chloride. This technique therefore also proves to be relatively expensive to implement.

These different techniques also share the disadvantage of having to be implemented at high pH values, generally greater than 10.

There is therefore a need for an alternative solution to these different methods of the prior art, allowing to reduce the dissolved silica content in water without having to use large amounts of chemical reagents, and which can be used at lower pH values.

To this end, the use of ion exchange resins is not industrially feasible. Indeed, the dissolved silica being mainly ionised only for pH values >9.4, its elimination by this method would require a pH adjustment in an alkaline range which, for water containing a certain alkalinity and/or hardness, would cause unwanted precipitation of carbonate salts. Moreover, since such anionic resins are not strictly selective with respect to dissolved silica, a large portion of the exchange capacity of these resins would be mobilised by the other anions (Cl, Br, $SO_4^{2}$, . . . ) present in the water to be treated. This lack of selectivity of the anion exchange resins makes this method industrially unsustainable for the removal of silica because it would require the use of too large amounts of resins.

Presentation of the Invention

This need is satisfied, thanks to the invention which relates to a method for treating water in order to reduce the dissolved silica content thereof, characterised in that it comprises at least one adsorption step consisting in passing said water through a reactor housing an adsorbent granular material consisting of grains of iron hydroxide (III) and/or iron oxyhydroxide (III) and at least one step of regenerating the adsorbing power of said granular material consisting in bringing said granular material into contact with a base and at least one chloride.

The invention therefore proposes to use such a material to adsorb dissolved silica and, when its adsorbing power with respect to this chemical species is insufficient, to regenerate this adsorbing power by bringing it into contact with a basic solution and an at least one chloride solution. The medium(s) containing these species can be used several times, until their silica content(s) is, or is estimated, too high. Thus, the cost of the method in terms of chemical reagents is low compared to the techniques of the prior art.

To the knowledge of the inventors, the joint use of a base and a chloride to regenerate the adsorbing power of iron hydroxides or oxyhydroxides (III) has never been proposed in the prior art. The inventors observed that the use of such solutions allowed to maintain the crystalline form of these compounds. However, it is this crystalline form that allows the adsorption of silica on this type of material.

Preferably, at least part of said adsorbent granular material is in the form of akaganeite.

Akaganeite is a mineral form of iron hydroxide (III) with the formula $\beta-Fe^{3+}O(OH,Cl)$. This material is known to adsorb silica (Naren and al. Adsorption Kinetics of silicilic acid on akaganeite 2013 J. Colloid Interface Sci. 399-2013 87-91) but this property has never been implemented at the industrial stage because no efficient regeneration method allowing its adsorption performance to be maintained was known.

Preferably, said granular material contains at least 5% by weight of akaganeite.

The inventors observed that the use according to the invention of a base and at least one chloride to regenerate the adsorbing power of the granular material allowed to maintain, or even improve, this adsorbing power.

According to the embodiments, the base and said at least one chloride may be used concomitantly or successively.

Thus, according to one variant, said regeneration step is carried out with a regeneration solution containing said base and said at least one chloride.

According to another variant, the regeneration step is carried out with two regeneration solutions, one containing said base, the other containing said chloride. The solution containing said at least one chloride can then be used before or after that containing the base.

Advantageously, said base is selected from the group consisting of NaOH, KOH, $NH_4OH$, LiOH. Preferably, NaOH is used.

Also advantageously, said chloride is selected from the group consisting of NaCl, KCl, LiCl, $NH_4Cl$, $MgCl_2$, $CaCl_2$, $BaCl_2$, $MnCl_2$. Preferably, NaCl is used.

In practice, the base will be used with a molarity comprised between 0.1 and 4 N, preferably between 0.5 and 2 N and the chloride will also be used with a molarity comprised between 0.1 and 4 N, preferably between 0.5 and 2 N.

Also preferably, said granular material is used in a fixed or fluidised bed and said adsorption step is carried out according to a volume load comprised between 5 and 30 BV/h ("bed volume per hour"), that is to say between 5 and 30 cubic metres of water passing per cubic metre of granular material per hour.

Preferably, said grains have a size comprised between 0.2 mm and 5 mm.

It will be noted that the method according to the invention can be implemented with a granular material in the form of a fixed or fluidised bed or else in an installation comprising an infinitely mixed reactor followed by a settling tank, said installation then being advantageously equipped with a pipe for recycling granular material settled in the reactor and means allowing to bring a part of the granular material extracted from the settling tank into contact with said base and said at least one chloride before returning the regenerated material into the reactor.

BRIEF DESCRIPTION OF THE FIGURES

The invention, as well as the various advantages that it has will be better understood thanks to the following description of an embodiment thereof given with reference to the drawings wherein.

DESCRIPTION OF EMBODIMENTS

Figure 1:
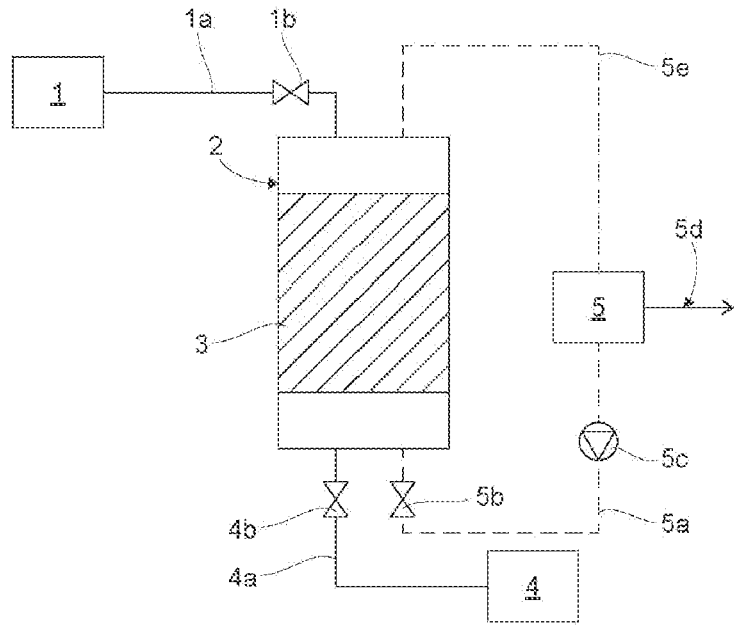
FIG. 1 is a schematic view of an installation for implementing the method according to the invention.

With reference to FIG. 1, a water treatment installation comprises a tank 1 of water to be treated, a reactor 2 containing the adsorbent granular material 3, a tank of treated water 4 and a tank of regeneration solution 5.

The tank of water to be treated 1 is connected by a pipe 1a equipped with a valve 1b at the upper part of the reactor 2, and the tank of treated water 4 is connected to the lower part of the reactor 2 by a pipe a equipped with a valve 4b.

The tank of regeneration solution 5 is connected to the lower part of the reactor 2 by a pipe 5a equipped with a valve 5b and a pump 5c and the upper part of the reactor 2 is connected by a recycling pipe 5e to this tank of regeneration solution 5. Finally, this tank of regeneration solution 5 comprises an evacuation pipe 5d.

It will be noted that the height of the granular adsorbent bed 3 in the reactor 2 may vary according to the embodiments and that it will generally be comprised between 0.5 m and 2 m.

The granular bed 3 is composed of grains of 0.2 mm to 5 mm of iron oxyhydroxide containing at least 5% by weight of akaganeite.

To treat the water contained in the tank 1 in order to reduce the dissolved silica content, the valves 1b and 4b are open so as to allow said water to flow through the pipe 1a into the reactor 2 in a downward flow and thus come into contact with the adsorbent granular material 3. The treated water is collected in the tank 4 through the pipe 4a. It will be noted that in other embodiments, it could just as well be considered to pass the water to be treated through the reactor in an upward flow.

This adsorption step is carried out with a volume load comprised between 5 and 30 BV/h ("bed volume per hour"), that is to say between 5 and 30 cubic metres of water passing per cubic metre of granular bed and per hour.

During the implementation of the adsorption step, the granular adsorbent bed gradually becomes loaded with silica and its adsorbing power decreases.

According to the embodiments, it may therefore be considered to monitor the concentration of dissolved silica remaining in the treated water collected in the tank 4 or to opt to limit the adsorption step to a predetermined time.

Once the adsorbent bed is considered to have an adsorption capacity below a given threshold or to have operated long enough, the valves 1b and 4b are closed so as to interrupt the passage of water to be treated into the reactor.

A step of regenerating the adsorbing power of the granular bed 3 can then be implemented.

To this end, a regeneration medium is produced. In the context of the present example, a 1 N sodium hydroxide solution NaOH was used wherein 50 g/L of 0.86 N sodium chloride NaCl were dissolved.

The valve 5b is then open and the pump 5c which is operated to inject this regeneration solution into the adsorbent granular bed 3. The regeneration solution then passes through the granular bed and is recovered in the upper part of the reactor 2 via the recycling pipe 5e which allows said regeneration solution to be redirected to the tank 5. During this regeneration step, the silica adsorbed on the iron oxyhydroxide grains containing at least 5% by weight of akaganeite, is transferred into the regeneration solution.

At the end of this step, the pump 5c is turned off and the valve 5b is closed, then the valves 1b and 4b are re-opened to start a new adsorption step.

Several cycles containing an adsorption step and a regeneration step can thus take place using the same regeneration solution. Said regeneration solution gradually becomes loaded with silica and when its silica concentration is considered too high and/or at the end of a predetermined number of such cycles, the consumed regeneration solution can be discharged through the pipe 5d and be completely or partially replaced by a new regeneration solution.

Thus, the method according to the invention is not very reagent hungry (base and chloride).

By way of comparison, a regeneration solution containing no chloride but containing only 1N NaOH was used, at 20° C. and at 50° C.

Figure 2:
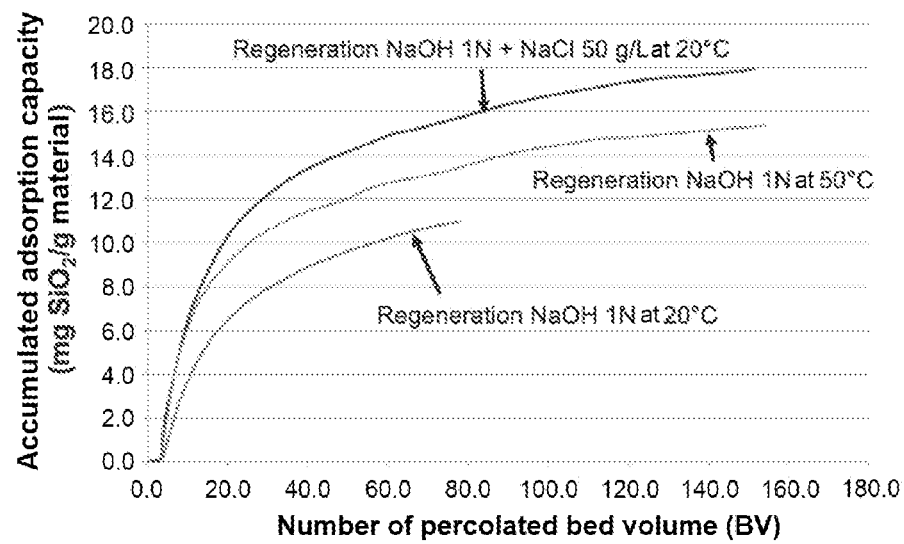
FIG. 2 is a graph indicating the evolution of the adsorbing power of the granular bed of the installation according to FIG. 1 after a regeneration step according to the invention (upper curve) and two regeneration steps outside the invention (two lower curves).

In the graph of FIG. 2 are plotted on the abscissa the volume load in BV/h and on the ordinate the adsorbing power of the adsorbent granular bed in milligrams of $SiO_2$ per gram of adsorbent material.

On this graph, the upper curve shows the adsorbing power of the granular bed after regeneration according to the invention with the regeneration medium described above made from 1N NaOH and 50 g/L of NaCl at 20° C., while the two lower curves reflect the adsorbing power of an identical granular bed after regeneration with a regeneration medium containing 1N NaOH but not containing chloride, at 20° C. (lower curve) and at 50° C. (median curve).

According to this graph, the regeneration of the adsorbent bed is notably better when, according to the invention, chloride ions are present in the regeneration solution. Even by heating the regeneration solution containing only NaOH at 50° C., the regeneration performance of the adsorbent bed remains lower than that observed with the regeneration solution produced, according to the invention, from NaOH and NaCl.

The method according to the present embodiment was carried out with a water to be treated containing 300 mg of dissolved silica per litre. The amount of silica adsorbed on the adsorbent material was measured after the first, seventh and eighth regeneration cycle with the regeneration solution containing chloride and base. The results are given in Table 1 below. These results also show that, unexpectedly, the adsorbing power of the granular material increases with the number of regeneration cycles recommended according to the invention. These tests were repeated and the same surprising result was obtained, highlighting a probable and continual activation and/or development of new adsorption sites on the material, induced by this mode of regeneration. A method according to the invention applied to a water to be treated containing a dissolved silica concentration comprised between 70 mg($SiO_2$)/L and 100 mg($SiO_2$)/L also showed an increase in the adsorbing power of the granular material with the number of regeneration cycles according to the invention, with values close to those presented in Table 1.

TABLE 1

| Number of regeneration cycles | milligrams of adsorbed silica per gram of adsorbent material | % by weight of silica adsorbed on the granular material |
| --- | --- | --- |
| 1 | 10.72 | 71 |
| 7 | 11.63 | 78 |
| 8 | 12.44 | 83 |

The invention claimed is:

1. A method of treating water containing dissolved silica and removing the dissolved silica from the water, comprising:

directing the water containing dissolved silica into a reactor containing an adsorbent granular material including iron hydroxide (III) or iron oxyhydroxide (III) and akaganeite;

passing the water containing the dissolved silica through the reactor and contacting the water with said adsorbent granular material;

reducing the concentration of dissolved silica in the water by adsorbing the silica in the water onto the adsorbent granular material, thereby forming treated water;

directing the treated water from the reactor;

at selected times, regenerating the adsorbent granular material by:

employing a regeneration solution containing a base and chloride ions;

ceasing to flow the water through the reactor;

directing the regeneration solution through the reactor and through the adsorbent granular material therein;

transferring silica adsorbed onto the adsorbent granular material to the regeneration solution; and directing the regeneration solution containing the silica from the reactor.

2. The method of claim 1 wherein said adsorbent granular material comprises at least 5% by weight of akaganeite.

3. The method of claim 1 including forming the regeneration solution by mixing a base solution with a chloride solution.

4. The method of claim 1 including forming the regeneration solution by mixing a sodium hydroxide solution with a sodium chloride solution.

5. The method of claim 1 wherein the base solution includes NaOH, KOH, NH4OH, or LiOH.

6. The method of claim 5 wherein the chloride solution comprises NaCl, KCl, LiCl, NH4Cl, $MgCl_2$, $CaCl_2$, $BaCl_2$, or $MnCl_2$.

7. The method of claim 1 including controlling the flow of water through the reactor such that 5-30 cubic meters of water per cubic meter of granular material passes through the reactor per hour.

8. The method of claim 1 including monitoring the concentration of the dissolved silica in the treated water and when the concentration of the dissolved silica in the treated water reaches a threshold value, ceasing the flow of water through the reactor and thereafter directing the regeneration solution through the reactor so as to regenerate the granular material.

* * * * *